Feb. 17, 1959 H. ZÖLLER 2,873,872
DEVICE FOR SWINGING THE FRONT PLATE ON
DUST BIN EMPTYING ARRANGEMENTS
Filed May 27, 1958 6 Sheets-Sheet 1
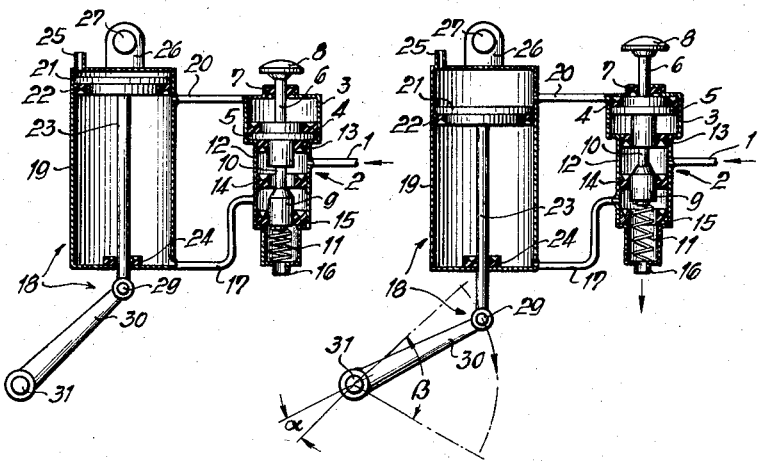
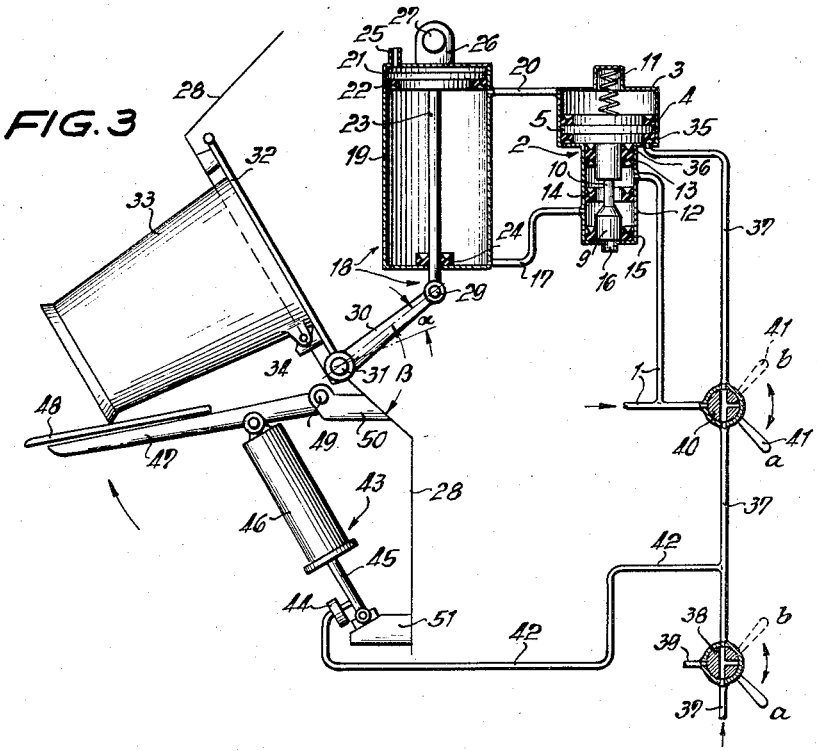
INVENTOR
Hans Zöller
By
Lowry + Rinehart
ATTYS.

INVENTOR
Hans Zöller
By
Lowry + Rinehart
ATTYS.

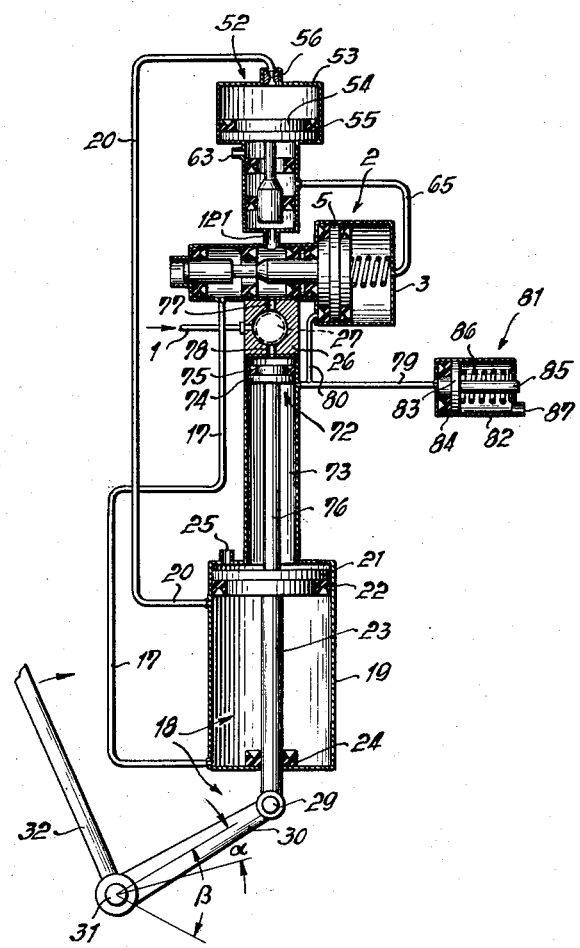

Feb. 17, 1959

H. ZÖLLER 2,873,872

DEVICE FOR SWINGING THE FRONT PLATE ON
DUST BIN EMPTYING ARRANGEMENTS

Filed May 27, 1958

INVENTOR

Hans Zöller

By

Lowry + Rinehart

ATTYS.

Feb. 17, 1959 H. ZÖLLER 2,873,872
DEVICE FOR SWINGING THE FRONT PLATE ON
DUST BIN EMPTYING ARRANGEMENTS
Filed May 27, 1958 6 Sheets-Sheet 6

INVENTOR
Hans Zöller
By
Lowry & Rinehart
ATTYS.

United States Patent Office 2,873,872
Patented Feb. 17, 1959

2,873,872
DEVICE FOR SWINGING THE FRONT PLATE ON DUST BIN EMPTYING ARRANGEMENTS

Hans Zöller, Laubenheim (Rhine), Germany

Application May 27, 1958, Serial No. 738,106

Claims priority, application Germany May 31, 1957

17 Claims. (Cl. 214—303)

The invention relates to a device for swinging the front plate on emptying arrangements for dust carts.

For emptying dust bins into refuse collectors, a dust bin tipper actuated by compressed air is used in known manner, which tips the full dust bins into a chute on the refuse collectors so that the refuse slides down the chute into the refuse collector or dust cart. To prevent the escape of dust, the chute is closed by a swing plate with a closing flap, the front plate and by a cloth arranged on the front plate and covering the range of swing from above and constructed as a tension roller blind. The front plate has above its pivot axis two hooks on which the dust bin is hung by the dustman. As the dust bin tips about these hooks constituting a tipping axis, its upper edge bears against the front plate and the dust bin together with the front plate carries out a further swinging movement about its pivot axis into the chute. The upper end of the front plate finally comes into contact with shock absorbers arranged in the chute and the refuse slides through the open closing flap of the front plate into the refuse cart, whereupon the front plate and the dust bin are swung back into their initial positions.

During the swinging movements of the front plate described above, the cloth of the tension roller blind, which enables any explosions or deflagrations in the refuse collector to escape without danger, winds onto and unwinds from its axle.

Instead of using a dust bin tipper, it is possible in the case of smaller dust bins to tip these hanging on the hooks of the front plate, by hand until they bear against the front plate and then swing the dust bin into and back out of the chute together with the front plate.

It is also known to swing the front plate back into its initial position by means of pressure springs, tension springs or torsion rod springs which are stressed during the swinging-in operation.

Such springs are open to the known objection that they can fail to act owing to breakage. This is particularly the case with return springs, because these springs are stressed and relaxed about 2000 times and more daily.

It has, therefore, already been proposed to provide a swinging device by connecting the front plate with a piston of a return swing cylinder through the intermediary of transmission elements and a carrier bolt arranged in the pivot axis of the front plate, the return cylinder being connected up with a compressed air container by means of a conduit. The air required is not used up during the swinging-in and out movements but merely moves to and fro between the compressed air container and the cylinder of the swinging device, whereby the impact of the front plate against the shock absorbers in the chute, which limit the movement of the front plate, is always damped.

When tipping the dust bin by hand, just as in the case of mechanical tipping by a tipping device, the front plate including the parts connected with it, such as the closing flap and the tension roller blind, must be swung-in against the pressure of the compressed air in the swinging device. Also when the dust bin is in swung-in position or when shaking the dust bin during the emptying operation the dustman must exert a considerable force when tipping by hand in order to maintain the dust bin with the front plate in tipped position against the pressure of the swinging device. In the case of mechanical tipping and when shaking the dust bin by means of a tipping device compressed air is also consumed.

The object of the invention is to provide a device of the character described which is simple in construction, economical to operate and which will effectively and efficiently perform the purposes for which it is intended.

According to the invention, a device for swinging the front plate on refuse collecting carts, comprises in combination an emptying chute arrangement, a carrier pin at the lower end of the mouth of said chute arrangement, a front plate pivotally mounted on said pin, a return swing device operatively connected with the front plate, said return swing device including a return swing cylinder, a return swing piston reciprocating in said return swing cylinder and having mounted at one side thereof one of the ends of a piston rod projecting with its opposite end through the return swing cylinder for actuating the front plate, a compressed air feed conduit leading to the return swing device, a pneumatically-actuated control valve between the return swing cylinder and the compressed air feed conduit to control the feed of compressed air to the return swing cylinder, said control valve having an exhaust leading into the open and first means to relieve the pressure in said return swing cylinder during the swing-in movement of the front plate after said plate with a dust bin thereon has swung through a small angle into the emptying chute arrangement, and second means in said control valve to connect the piston rod side of the return swing piston with the compressed air feed conduit for swinging the front plate back by means of the return swing device, the compressed air feed and exhaust for the return swing device being controlled by said control valve in dependency upon the movements of said return swing device.

By associating a pilot valve with the control valve the initiation of the return swinging movement of the front plate with the empty dust bin can be retarded for a predetermined time so that the refuse can slide completely out of the dust bin through an opening in the front plate into the vehicle. The feed and exhaust of the compressed air for the return swing device is in this case controlled by the control valve in dependency upon the movement of the pilot valve and the return swing piston in the return swing device.

In another form of construction a pneumatically operated swing-in device connected with the return swing device and controlled by the control valve and the pilot valve according to the movements of the pistons of these devices may be provided.

According to still another form of construction the movement of the swing-in device is initiated and assisted by a pneumatically actuated piston in an auxiliary cylinder acting on a swing arm for the dust bin.

Several preferred embodiments of the invention are illustrated by way of example in the accompanying drawings, in which:

Figs. 1 and 2 are sectional views showing respectively a swinging device with the control valve in position of rest and shortly after the commencement of the swing-in movement of the front plate;

Fig. 3 is a partial sectional view of the swinging device with the control valve connected up with a dust bin tipper, shown on a reduced scale;

Fig. 5 is a sectional view of a return swing and swing-in device with fitted control and pilot valves and also locking devices for locking the dust bin on the front plate;

Figure 4:
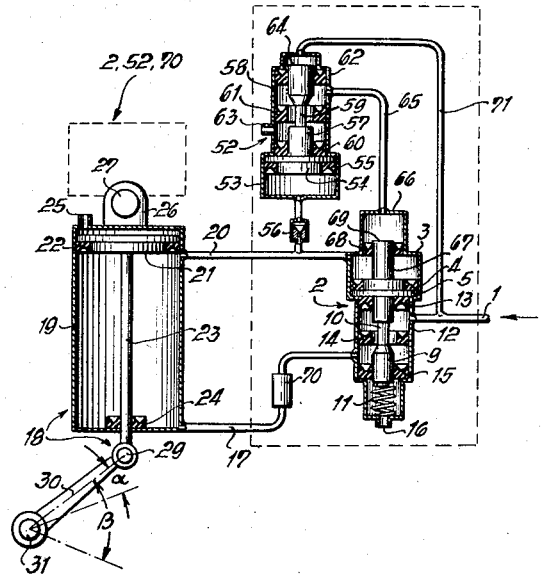
Fig. 4 is a sectional view of the swinging device with the control valve and a pilot valve in position of rest.

As shown in Figs. 1 and 2, a compressed air feed conduit 1 is connected up with a control valve 2 which is mounted in a housing 12 and comprises a control piston 5 provided with a gasket 4 and arranged in a control cylinder 3. The control piston 5 is secured to one of the ends of a push rod 6 which extends through a gasket 7 into the open and is provided with an operating knob 8 at its opposite end. The control piston 5 is provided with a control slide valve 9 having a constriction or neck 10 and acted upon by a pressure spring 11. The slide valve 9 is guided in a gasket 13 and slides between gaskets 14 and 15 in the housing 12 provided with a vent or outlet 16 communicating with the atmosphere.

The compressed air feed conduit 1 leads into the housing 12 of the control valve 2 between the gasket 13 and the gasket 14, whereas between the gasket 14 and the gasket 15 a connecting conduit 17 leads to the lower end of a cylinder 19 of a return swing device 18. The control cylinder 3 is also connected at its lower end by a control conduit 20 with the cylinder 19 of the return swing device 18, said control conduit 20 terminating in a bore in the cylinder wall which is arranged below the upper dead-centre position of a return piston 21 mounted to move to and fro in the cylinder 19 of the return swing device 18.

The cylinder 19 is provided at its upper end with an outlet 25 leading into the open and is oscillatably hung by means of an eye 26 on a supporting bolt 27 fixed on a chute housing 28. The return swing piston 21 is equipped with a gasket 22 and connected by a piston rod 23, guided in a gasket 24, via a hinge 29 and a lever 30 with a carrier pin 31 on an apertured front plate 32.

When the return swing device 18 is in its inoperative position shown in Fig. 1, the compressed air feed conduit 1 communicates with the cylinder 19 via the control valve 2 and conduit 17 and the cylinder 19 with the control cylinder 3 via the control conduit 20, whereby the compressed air in the cylinder 19 maintains the piston 21 in its upper dead-centre position and consequently the front plate 32 in its locked position and also the control piston 5 in the control valve 2 in its lower dead-centre position.

If the front plate 32 with a dust bin 33 is tipped by hand or by a dust bin tipper, the carrier pin 31 is turned and the lever 30 pulls the piston rod 23 with the piston 21 in downward direction. As soon as the angle of swing α has been surpassed, as shown in Fig. 2, the return swing piston 21 has slid over the bore for the control conduit 20 in the cylinder wall. The compressed air in the control cylinder 3 now escapes into the open via the control conduit 20 and the outlet 25 at the upper end of the cylinder 19 so that the spring 11 shifts the control slide valve 9 with the control piston 5 upwardly. Thus the flow from the conduit 1 is blocked by the gasket 14 and the discharge of compressed air from the cylinder 19 into the open is free via the conduit 17 past the gasket 15 to the outlet 16. In this manner the return swing device 18 is free from pressure and the swing-in operation and, if necessary, the shaking can take place without counter-pressure of the return swing device 18, with an economic consumption of compressed air.

In this form of construction the control piston 5 with the control slide valve 9 is pushed downwardly against the pressure of the spring 11 by actuating the operating knob 8 so that the flow to the outlet 16 is again closed by the gasket 15 and the compressed air from the conduit 1 is free to flow past the gasket 14. The compressed air now flows through the conduit 17 again into the cylinder 19 of the return swing device 18, loads the piston rod side of the piston 21, shifts the piston 21 upwardly and swings the front plate 32 through an angle β (Fig. 2) back into its position of rest. As soon as the piston 21 again slides over the bore of the control conduit 20 on its way into its upper dead-centre position, compressed air flows through the control conduit 20 into the control valve 2 and maintains the control piston 5 in its lower dead-centre position against the pressure exerted by the spring 11.

According to another form of construction which is illustrated in Fig. 3 the control valve 2 is pneumatically and positively actuated both during the swing-in and swing-out movements. In the control cylinder 3 the control piston 5 is arranged which is under the influence of the pressure spring 11 and equipped with the gasket 4 and a gasket 35. The control slide valve 9 of this piston 5 is provided with a neck or constriction 10 and guided in the gasket 13 and a gasket 36 which gaskets seal in opposite directions. The slide valve 9 reciprocates between the gaskets 14 and 15. The control cylinder 3 is connected at its upper end with the cylinder 19 of the return swing device 18 by the control conduit 20 and at its end carrying the slide valve with a source of compressed air via a second compressed air feed conduit 37.

For actuating a dust bin tipper 43 a check valve 38, having an outlet 39 leading into the atmosphere, and a three-way valve 40 with a handle 41 are arranged in the compressed air feed conduit 37. The compressed air feed conduit 1 also leads from the source of compressed air to the three-way valve 40 and to the control valve 2.

The gaskets 13 and 36 sealing in opposite directions and arranged in the housing of the control slide valve 9 seal the control cylinder 3 from the housing 12 of the control slide valve 9. Between these gaskets 13 and 36 and the gasket 14 the compressed air feed conduit 1 terminates, whereas between the gasket 14 and the gasket 15 the conduit 17 leads to the cylinder of the return swing device 18. A conduit 42 branches from a point between the check valve 38 and the three-way valve 40 to a connecting piece 44 and into a piston rod 45 of a tipper cylinder 46. This piston rod 45 is provided with a longitudinal bore. The tipper cylinder 46 can swing about a swing arm 47 carrying an oscillatable plate 48 for supporting the dust bin 33. The swing arm 47 engages by means of a bolt 49 a bracket 50 fixed on the chute housing 28 of the dust cart or refuse collector. The piston rod 45 is also pivotally mounted on a bracket 51 fixed on the chute housing 28.

If the check valve 38 is opened, compressed air flows from the compressed air feed conduit 37 through the conduit 42 and the longitudinal bore in the piston rod 45 into the tipper cylinder 46, which tips the swing arm 47, the dust bin 33 hung on hooks 34 of the front plate 32 and the front plate 32 itself into the chute housing. As soon as the front plate 32 has swung through the small angle α, the piston 21 in the cylinder 19 slides over the bore in the cylinder wall, as above described, so that the return swing device 18 is exhausted into the atmosphere and the front plate 32 is swung with the dust bin 33 through the angle β into the chute housing 28 without being opposed by counter-pressure.

If the check valve 38 is closed so that the compressed air flow from the source of compressed air is shut-off and at the same time the tipper cylinder 46, the conduit 42 and the conduit 37 to the control cylinder 3 are relieved from pressure through the outlet 39 in the check valve 38, the pressure spring 11 pushes the control piston 5 of the control valve 2 downwardly and the return swing device 18 returns the swung-in parts into their initial positions.

When bulky refuse, which cannot be accommodated in a dust bin, is to be dumped into the dust cart by hand, the three-way valve 40 is shifted by means of its handle 41 out of the position $a$ into the position $b$ so that the compressed air from the conduit 1 flows through the three-way valve 40 and the conduit 37 into the control cylinder 3 and the slide-valve side of the control piston 5 is loaded and the piston 5 shifted against the pressure exerted by the pressure spring 11. The front plate 32 can then be swung into the chute housing by hand. As soon as the front plate 32 has swung through the angle $\alpha$ in the manner described above, the compressed air escapes from the cylinder 19 into the open and the front plate 32 can be swung into the chute housing 28 without encountering any counter pressure from the return swing device 18.

To swing back the front plate 32 out of the chute housing into its position of rest after the bulky refuse has been tipped into the cart by hand, the handle 41 is shifted out of the position $b$ into the position $a$, when the compressed air escapes into the open from the control cylinder 3 through the outlet 39 of the check valve 38.

During this operation the pressure spring 11 pushes the control piston 5 with the control slide valve 9 downwardly, as already described, so that the return swing device 18 swings the front plate 32 out of the chute housing into its inoperative position and there holds it.

In order to retard the return swing movement of the front plate 32 with the dust bin 33 for a predetermined period so that the refuse can slide completely out of the dust bin through the aperture in the front plate 32 into the vehicle, instead of operating the control valve 2 by hand as shown in Figs. 1 and 2 or automatically as shown in Fig. 3, a pilot valve 52 can be coordinated to the control valve 2.

As can be seen from Fig. 4, the pilot valve 52 has a control cylinder 53 communicating with the conduit 20 for the return swing device 18 through the intermediary of an exchangeable nozzle 56 and accommodating a control piston 54 provided with a gasket 55. A control slide valve 57 provided with a constriction or neck 59 is guided in a gasket 60 and slides between two gaskets 61 and 62 in a housing 58 provided with an outlet 63 communicating with the atmosphere. Between the two gaskets 61 and 62 a branch conduit 65 leads to a space 66 in the control valve 2 in which a piston rod 67 arranged on the control piston 5 slides in a gasket 68.

When the control valve 2 has opened the path for the compressed air to pass from the conduit 17 through the gasket 15 to the outlet 16 leading into the open, a quick-action exhaust valve 70, known per se, which is arranged in the conduit 17, opens so that the compressed air escapes suddenly into the open from the cylinder 19.

As soon as the piston 21 of the return swing device 18 has slid over the bore in the cylinder 19 for the control conduit 20 during its downward movement, the pressure medium acting as cushion in the control cylinder 53 flows off more or less quickly—according to the size of the exchangeable nozzle 56—via the control conduit 20 to the outlet 25 of the return swing cylinder 19. The nozzle 56 is chosen of such size that the air from the control cylinder 53 flows off with a retardation of up to several seconds. The compressed air, which acts on end face 64 of the control slide valve 57 of the pilot valve 52 and comes from the compressed air feed conduit 1 via a conduit 71, now shifts the control slide valve 57 with the control piston 54 in such a manner that the compressed air can flow past the gasket 62 through the conduit 65 to the space 66 in the control valve 2 and the path to the outlet 63 is closed by the gasket 61.

In this way, after the predetermined retardation, during which the refuse can slide out of the dust bin 33 into the dust cart, end face 69 of the piston rod 67 of the control piston 5 in the control valve 2 is loaded with compressed air so that the control slide valve 9 can be pushed downwardly against the pressure exerted by the spring 11. The subsequent movements then take place in the manner described above.

As soon as the piston 19 of the return swing device 18 has again slid over the bore for the control conduit 20 on its way into its upper dead-centre position, compressed air flows through the control conduit 20 and the nozzle 56 into the control cylinder 53 and shifts the control piston 54 with the control slide valve 57 into its upper dead-centre position. The device is then ready for the next swing-in movement, the compressed air imprisoned in the control cylinder 53 flowing off once more through the nozzle 56.

In another form of construction shown in Fig. 5, the return swing device 18 is connected with a pneumatically operated swing-in device 72 and the control valve 2 and the pilot valve 52, which are interconnected by a passage 121, control these arrangements dependent upon the movements of the pistons of the swing-in device 72 and the return swing device 18.

As illustrated in Fig. 5 a swing-in cylinder 73 extends from the cylinder 19 of the return swing device 18 and forms therewith a constructional unit. In this cylinder 73 of the swing-in device 72 a piston 74 provided with a gasket 75 is accommodated and joined with the piston 21 of the return swing device 18 by a piston rod 76.

At the upper end of the swing-in cylinder 73 a cylinder eye 26 is arranged by means of which the return swing device 18 and the swing-in device 72 are suspended on a supporting bolt 27 fixed on the chute housing. The compressed air feed conduit 1 leads through the eye 26 to the supporting bolt 27 provided with apertures and through passages 77 and 78 on the one hand to the control valve 2 assembled with the eye 26 and on the other hand to the swing-in cylinder 73.

Below the upper dead-centre position of the piston 74 of the swing-in device 72 a conduit 79 leads to a stopping device 81 and via a connecting conduit 80 to a control cylinder 3 on the slide-valve side of the control piston 5. The locking device 81 consists of a cylinder 82 provided with an outlet 87 to the atmosphere and accommodating a piston 83 loaded by a pressure spring 86 and fitted with a gasket 84 and a locking bolt 85.

Figure 6:
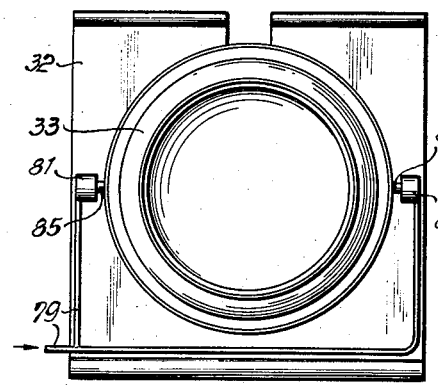
Figs. 6 and 7 are front and side elevations showing respectively the locking devices for the dust bin mounted on the front plate.
Figure 7:
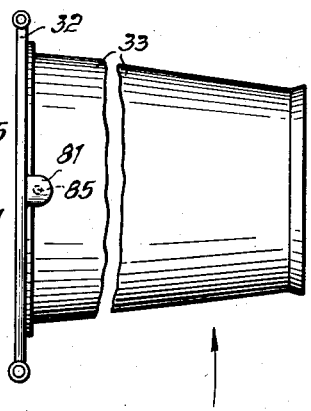

On each side of the front plate 32 a locking device 81 is arranged at the height of the horizontal central line thereof, as illustrated in Figs. 6 and 7.

Figure 8:
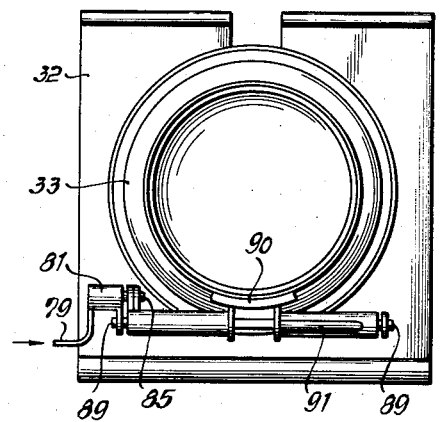
Figs. 8 and 9 are front and side elevations showing respectively a tipping frame for the dust bin hinged on the front plate.
Figure 9:
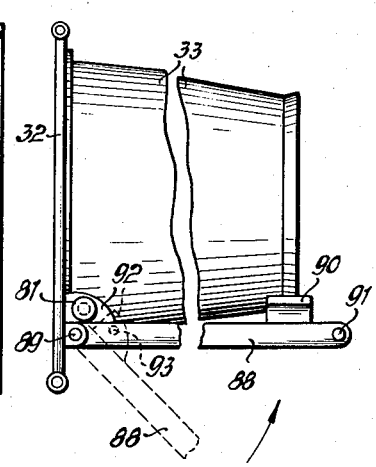

According to still another form of construction and as shown in Figs. 8 and 9, a tip frame 88 for the dust bin 33 is arranged on the front plate 32 and pivotable about two bolts 89, which frame carries at its lower end a bearing plate 90 for the dust bin 33 and also a handle 91. A rest plate 92 provided with a bore 93 for the locking bolt 85 is arranged on the upper end of the tip frame 88.

The device operates in the following manner:

As soon as the upper edge of the dust bin 33, which has been swung up by the dustman in the direction of the arrow shown in Fig. 9, comes into contact with the front plate 32, the dust bin 33 swings with the front plate 32 about the axis of the carrier pin 31 into the chute housing. During this movement, when the angle $\alpha$ (Fig. 1) has been traversed, both the piston 74 has freed the bore in the cylinder wall for the conduit 79 and also the return swing piston 21 has freed the bore in the cylinder wall for the control conduit 20. The compressed air feed conduit 1, as shown in Fig. 5, now communicates with the conduit 79 for the locking device 81 through the intermediary of the passage 78 in the eye 26 of the swing-in device so that, according to the form of construction illustrated in Fig. 6, the locking bolt 85 engages under the upper edge of the dust bin 33 and the dust bin is locked with the front plate 32.

The compressed air flowing into the swing-in cylinder 73 through the eye 26 (Fig. 5) and the apertures in the supporting bolts 27 and the passage 78, shifts the piston 74 in downward direction. The piston 21 and the piston rod 23 as well as the lever 30 and the carrier pin 31 participate in this movement so that the front plate 32 swings through the angle β into the chute housing without counter pressure from the return swing device 18.

As soon as the return swing piston 21 has uncovered the aperture leading to the conduit 20, the compressed air imprisoned in the control cylinder 53 flows slowly through the nozzle 56 to the outlet 25 so that, as described above, the front plate after a previously set delay, again swings back with the dust bin 33 out of the chute housing.

As soon as the piston 74 of the swing-in device 72 has slid once more over the bore in the cylinder wall for the conduit 79 leading to the locking device 81, the compressed air escapes from the locking device 81 through the cylinder 73 and the outlet 25 into the open, so that the locking bolt 85 again releases the edge of the dust bin 33.

When using a tip frame 88 according to the construction illustrated in Figs. 8 and 9, the dust bin 33 is hung on the tip frame 88 and the tip frame 88 swung upwardly with the aid of the handle 91 in the direction of the arrow by hand until the upper edge of the dust bin 33 bears against the front plate 32 and swings therewith into the chute housing. However, as soon as the front plate has swung through the angle α the rest plate 92, which is arranged at the top on the tip frame 88, has assumed the position with its bore 93 in the axis of the locking device 81. The locking bolt 85, which is actuated in the manner described above, slides in the bore 93, with the result that the tip frame 88 remains locked with the front plate 32 until the release is effected in the manner described above during the return swing movement.

Figure 10:
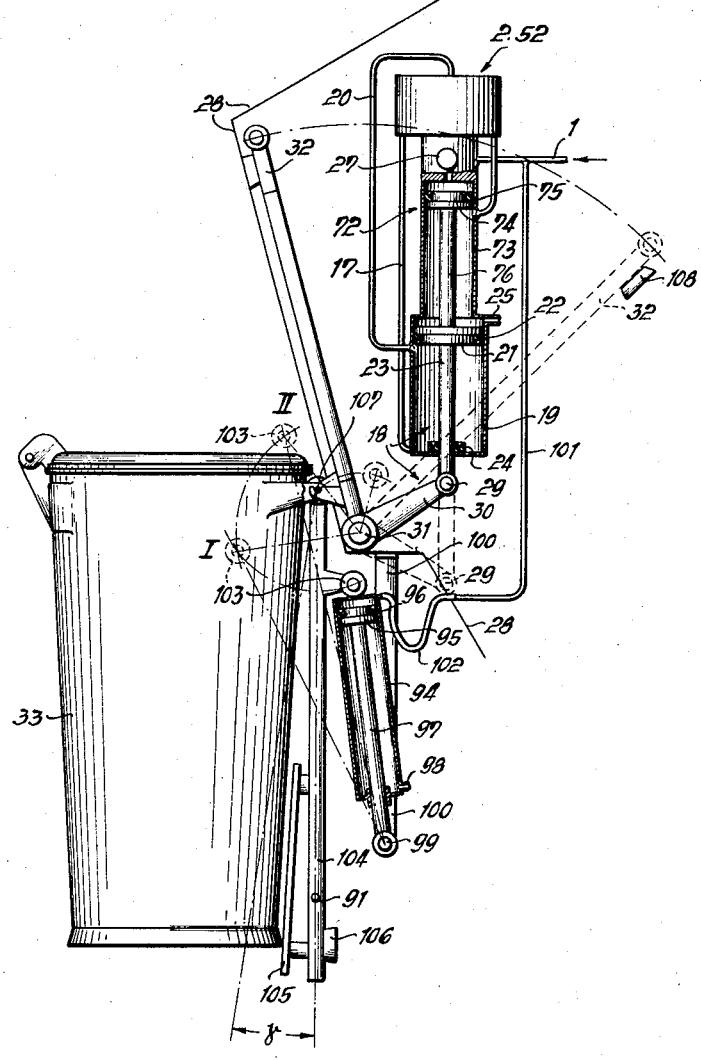
Fig. 10 is a sectional view of the return swing and swing-in device with an additional auxiliary cylinder engaging the swing arm for the dust bin.
Figure 11:
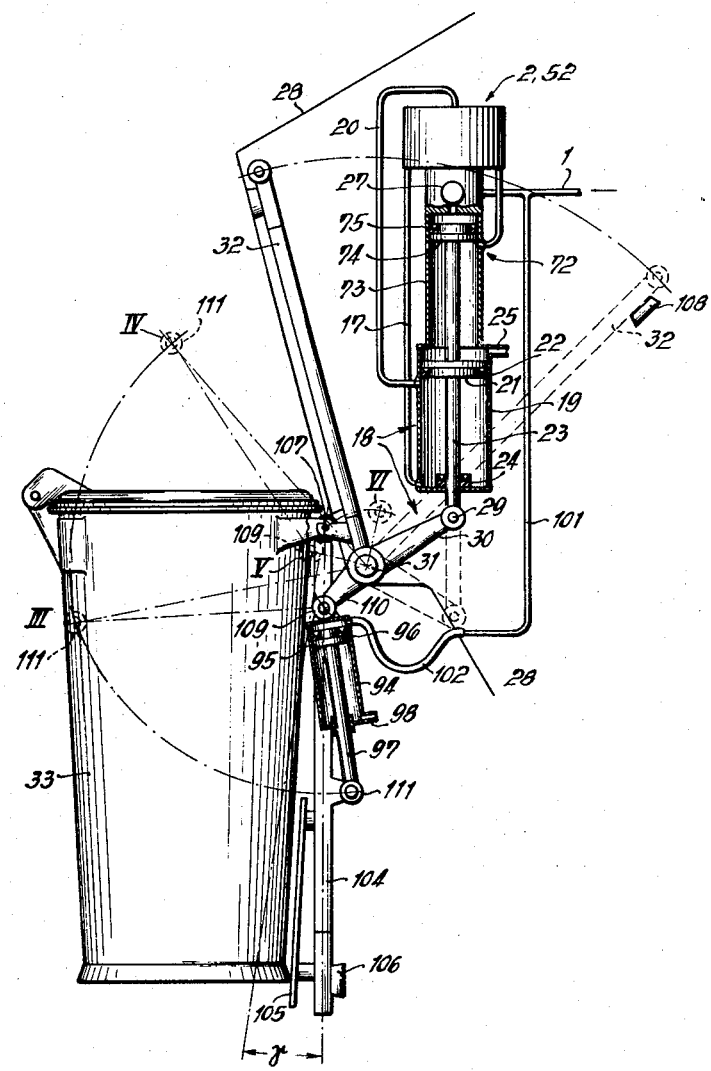
Fig. 11 is a view similar to Fig. 10, showing a modification of the form of construction illustrated in said figure.

In the case of construction illustrated in Figs. 10 and 11 the movement of the swing-in device 72 is introduced and assisted by a pneumatically actuated auxiliary piston 95 engaging a swing arm for the dust bin 33 and accommodated in an auxiliary cylinder 94.

A conduit 101 leads from the compressed air feed conduit 1 via a hose 102 to the auxiliary cylinder 94 which is constantly under compressed air pressure and which is connected to a swing arm 104 mounted on the front plate 32 in a hinge 107, by means of a hinge 103.

The piston 95 is provided with a gasket 96 and accommodated in the auxiliary cylinder 94 provided with an outlet 98, and rests by means of a piston rod 97 on a hinge bolt 99 which is held stationary by a strap 100 fixed on the chute housing 28.

The swing arm 104 is provided with a handle 91 and a bearing plate 105 for the dust bin 33 and in inoperative position rests against a stop 106 on the chute housing 28.

When the auxiliary cylinder 94 and the swing arm 104 are in inoperative position, the axis of the piston rod 97 and the connection line between the hinge 103 of the auxiliary cylinder 94 on the swing arm 104 and the hinge 107 of the swing arm 104 on the front plate 32 form a flat, obtuse angle of about 170° with the hinge 103 of the auxiliary cylinder 94 as apex.

The relative arrangement of the three hinges 99, 103 and 107 is so chosen that when the device is in position of rest, the action of force of the auxiliary cylinder 94, which is always under pressure, and of the auxiliary piston 95 presses the swing arm 104 against the stop 106 on the chute housing 28.

If the swing arm 104 is turned out of its inoperative position against the stop 106 through a small angle γ by hand by means of the handle 91 in order to initiate the swing movement, the hinge 103 of the auxiliary cylinder 94 moves out so far that it turns the swing arm 104 about the hinge 10 on the front plate 32. The hinge 103 of the auxiliary cylinder 94 thereby describes an arc about the hinge 107 of the swing arm up to the position I (Fig. 10). The dust bin 33 is then automatically swung so far that its upper edge bears against the front plate 32.

The swing arm 104, dust bin 33 and front plate 32 are now automatically swung jointly about the carrier pin 31 into the chute housing 28. After turning through and angle α, as above described, the swing-in device 72 assists the action of the auxiliary cylinder 94 the hinge of which assumes the position II as soon as the front plate strikes against a stop 108 in the chute housing 28.

At the end of the period of delay, the return swing device 18 swings back the front plate 32, the dust bin 33 and the swing arm 104 out of the chute housing, the unbalance of the emptied dust bin 33 and of the swing arm 104 returning the auxiliary cylinder 94 into its initial poistion against the pressure of the compressed air. The auxiliary cylinder 94 acts thereby as compressed air accumulator because the compressed air is forced back to the source of compressed air. Consequently, the movement of the parts to be tipped back is retarded and cushioned so that the swing arm 10 contacts gently against the stop 106.

In the case of the form of construction according to Fig. 11, the auxiliary cylinder 94 is articulated by a hinge 109 to a lever 110 fixed on the front plate 32, whereas the piston rod 97 pivotally engages a hinge bolt 111 fixed on the swing arm 104. As soon as the swing arm 104 is swung through an angle γ by hand, the hinge bolt 111 between the piston rod 97 and the swing arm 104 moves into the position III. The dust bin 33 has then come to bear against the front plate 32, as above described, and is now swung into the chute housing 28 by the auxiliary cylinder 94 in cooperation with the swing-in device 72. The hinge bolt 111 moves thereby out of the position III into the position IV and the hinge 109 over the position V into the position VI.

Figure 12:
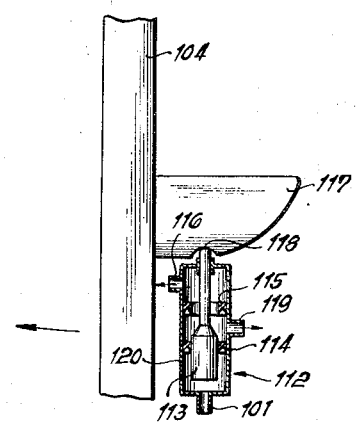
Fig. 12 is a sectional view of a shutoff valve for the auxiliary cylinder actuated by the swing arm for the dust bin.

If it is desired to prevent the auxiliary cylinder 94 from being continually loaded by compressed air, an additional arrangement is provided which in position of rest shuts off the conduit 101 from the auxiliary cylinder 94 and exhausts the auxiliary cylinder 94 into the atmosphere through an outlet 116 shown in Fig. 12. As can be seen from Fig. 12, a push rod 113 of a valve slide 112 is actuated by a nose 117 on the swing arm 104 in such a manner that the compressed air flow from the conduit 101 is cut off on a gasket 114 in a housing 120 and the compressed air flow from the auxiliary cylinder 94 is established via a conduit 119 past a gasket 115 to the outlet 116 leading into the open. The push rod 113 rests thereby in a depression 118 in the nose 117. As the swing arm 104 turns through the angle γ, the nose 117 liberates the push rod 113. The compressed air then pushes the valve slide 112 so that the path to the outlet 116 is closed and the path to the auxiliary cylinder 94 past the gasket 114 is open.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. A device for swinging the front plate on refuse collecting carts, comprising in combination an emptying chute arrangement, a carrier pin at the lower end of the mouth of said chute arrangement, a front plate pivotally mounted on said pin, a return swing device operatively connected with the front plate, said return swing device including a return swing cylinder, a return swing piston reciprocating in said return swing cylinder and having mounted at one side thereof one of the ends of a piston reciprocating in said return swing cylinder and having return swing cylinder for actuating the front plate, a compressed air feed conduit leading to the return swing device, a pneumatically-actuated control valve between the return swing cylinder and the compressed air feed conduit to control the feed of compressed air to the return swing cylinder, said control valve having an exhaust leading into the open and first means to relieve the pressure in said return swing cylinder during the swing-in movement of the front plate after said plate with a dust bin thereon has swung through a small angle into the emptying chute arrangement, and second means in said control valve to connect the piston rod side of the return swing piston with the compressed air feed conduit for swinging the front plate back by means of the return swing device, the compressed air feed and exhaust for the return swing device being controlled by said control valve in dependency upon the movements of said return swing device.

2. A device as set forth in claim 1, wherein a pilot valve is operatively connected with the control valve to delay the initiation of the return swinging movement of the front plate for a predetermined time.

3. A device as set forth in claim 1, wherein a pneumatically operated swing-in device is connected with the return swing device and is controlled by the control valve in dependency upon the movements of said devices.

4. A device as set forth in claim 1, wherein a pneumatically operated swing-in device is connected with the return swing device and is controlled by the control valve in dependency upon the movements of said devices, a pneumatically operated piston being arranged in an auxiliary cylinder and acting upon a swing arm connected to the swing-in device to initiate and assist the movement of said swing-in device.

5. A device as set forth in claim 1, wherein the pneumatically-actuated control valve is loaded by a pressure spring and consists of a control piston arranged in a control cylinder and carrying a control slide valve provided with an intermediate constriction and slidable between gaskets.

6. A device as set forth in claim 1, wherein a control cylinder in the pneumatically-actuated control valve is connected with the return swing cylinder by a control conduit terminating in the return swing cylinder below the upper dead-centre position of the return swing piston, and wherein a control slide valve is arranged in a housing connected with the control valve and, preferably in conjunction with an intermediate quick-action exhaust valve, connected to the lower end of the return swing cylinder by means of a connecting conduit so that this conduit according to the position of the control slide valve is in communication alternately with the compressed air feed conduit and with the outlet of the control valve communicating with the atmosphere.

7. A device as set forth in claim 1, wherein the control valve, if the device is hand-operated, is provided with a push rod projecting from the control valve and carrying at its free end a knob for initiating the return swing movement.

8. A device as set forth in claim 1, wherein, when using a pneumatically operated dust bin tipper for tipping the dust bin, a second compressed air feed conduit is connected, via a check valve provided with an outlet leading into the open, on the one hand with a tipper cylinder and on the other hand with a control piston in the control valve, a three-way valve being arranged in the second medium feed conduit and having a housing connected up with the first compressed air feed conduit.

9. A device as set forth in claim 1, wherein a pneumatically operated pilot valve is operatively connected with the control valve to delay the initiation of the return swinging movement of the front plate for a predetermined time and comprises a control cylinder accommodating a control piston carrying a control slide valve arranged in a housing and provided with a constriction and an end face to be loaded with compressed air, said slide valve being slidable between gaskets between which a conduit for loading the control valve with compressed air terminates, said housing of the control slide valve having an aperture leading into the open and the control cylinder communicating with the return swing cylinder over an exchangeable nozzle and a control conduit.

10. A device as set forth in claim 1, wherein a pneumatically operated swing-in device is connected with the return swing device and comprises a swing-in cylinder, a swing in piston and a piston rod, said cylinder of the swing-in device and the return swing cylinder of the return swing device constituting a constructional unit and the swing-in piston being connected by its piston rod with the return swing piston.

11. A device as set forth in claim 1, wherein the control valve, connected with an eye on a swing-in cylinder of an oscillatably suspended swing-in device and with a pilot valve adapted to delay the initiation of the return swinging movement of the front plate, communicates through passages in the eye and apertures in a supporting bolt fixed on the chute housing and engaging the eye, both with the compressed air feed conduit and with the swing-in cylinder of the swing-in device and also, via another passage, with the pilot valve.

12. A device as set forth in claim 1, wherein a pneumatically operated swing-in device is connected with the return swing device and comprises a swing-in cylinder, a swing-in piston and a piston rod, and wherein the pneumatically-actuated control valve is loaded by a pressure spring and consists of a control piston arranged in a control cylinder and carrying a control slide valve, said cylinder of the control valve communicating on the slide valve end via a control conduit with the swing-in cylinder below the upper dead-centre position of the swing-in piston.

13. In a device as set forth in claim 1, a pneumatically operated swing-in device connected with the return swing device and comprising a swing-in cylinder, a swing-in piston and a piston rod, two locking devices arranged laterally in the horizontal central line of the front plate for coupling the upper edge of the dust bin with the front plate during the swinging operation, each of said locking devices comprising a cylinder for a piston equipped with a pressure spring and a locking bolt and said cylinder being connected by a conduit with the swing-in cylinder of the swing-in device below the upper dead-centre position of the swing-in piston.

14. A device as set forth in claim 8, wherein a tip frame, pivotable about two bolts at the lower end of the front plate, is provided with a handle and a bearing plate for the dust bin, and on its upper end with a rest plate with a bore in which a locking bolt of a locking device engages as soon as the dust bin bears against the front plate and is tipped therewith through a predetermined angle into the chute housing.

15. A device as set forth in claim 4, wherein the auxiliary cylinder is oscillatably mounted on the emptying chute arrangement, constantly loaded with compressed air from the compressed air feed conduit and connected with the swing arm on the front plate, and wherein the piston of the auxiliary cylinder has a piston rod engaging with one end thereof a hinge pin fixed on the chute housing and, when in inoperative position, the axis of the piston rod and the connecting line between a hinge of the auxiliary cylinder on the swing arm and a hinge of the swing arm on the front plate form a flat obtuse angle of about 170° with the hinge of the auxiliary cylinder as apex which cylinder, on the device being set in operation by hand by turning the swing arm through a predetermined angle, shifts in such a manner that the piston and the auxiliary cylinder swing the swing arm until the dust bin bears against the front plate and then swings the swing arm, the dust bin and the front plate jointly with the aid of the swing-in device into the chute housing until the front plate strikes against a stop arranged within the chute housing.

16. A device as set for in claim 15, wherein the auxiliary cylinder is provided connected to a lever fixed on the front plate and the piston rod of the piston in said cylinder pivotally engages a bolt on the swing arm fixed on the front plate.

17. A device as set forth in claim 15, wherein a nose on the swing arm slides on a push rod of a slide valve between gaskets arranged in a valve housing, said valve housing provided with an exhaust, being connected by a conduit with the compressed air feed conduit and by another conduit with the auxiliary cylinder.

No references cited.